United States Patent
Peeters et al.

(10) Patent No.: US 10,140,626 B1
(45) Date of Patent: Nov. 27, 2018

(54) SYSTEM AND METHOD FOR MANAGING MAINFRAME COMPUTER SYSTEM BILLABLE USAGE

(71) Applicant: CA, Inc., Islandia, NY (US)

(72) Inventors: Johannes Gerardus Jozef Peeters, Jade (DE); Friedhelm Herbert Stoehler, Augsburg (DE); Horst Walter Doehler, Untermerzbach (DE)

(73) Assignee: CA, Inc., Islandia, NY (US)

( * ) Notice: Subject to any disclaimer, the term of this patent is extended or adjusted under 35 U.S.C. 154(b) by 230 days.

(21) Appl. No.: 14/798,621

(22) Filed: Jul. 14, 2015

Related U.S. Application Data

(60) Provisional application No. 62/024,008, filed on Jul. 14, 2014.

(51) Int. Cl.
  *G06Q 30/02* (2012.01)
  *G06Q 20/14* (2012.01)
(52) U.S. Cl.
  CPC ....... *G06Q 30/0223* (2013.01); *G06Q 20/145* (2013.01)
(58) Field of Classification Search
  USPC .......................................................... 705/34
  See application file for complete search history.

(56) References Cited

U.S. PATENT DOCUMENTS

| | | | |
|---|---|---|---|
| 5,987,107 A * | 11/1999 | Brown | H04M 15/00 379/111 |
| 7,054,934 B2 | 5/2006 | Graupner | |
| 7,069,558 B1 | 6/2006 | Stone | |
| 7,430,741 B2 | 9/2008 | Ayachitula | |
| 7,752,415 B2 | 6/2010 | Vaupel | |
| 7,844,709 B2 | 11/2010 | Aman et al. | |
| 8,458,714 B2 | 4/2013 | King | |
| 2004/0168170 A1 | 8/2004 | Miller | |
| 2011/0185062 A1 | 7/2011 | Foege | |
| 2011/0283289 A1* | 11/2011 | Jayaraman | G06F 9/5061 718/104 |
| 2012/0030331 A1 | 2/2012 | Karampatsis | |
| 2012/0311154 A1 | 6/2012 | Morgan | |
| 2013/0055277 A1 | 2/2013 | Ashish | |
| 2013/0132570 A1 | 5/2013 | Lopez Nieto | |
| 2013/0091282 A1 | 11/2013 | Tontiruttananon | |
| 2017/0090989 A1* | 3/2017 | van Velzen | G06F 9/5038 |

* cited by examiner

*Primary Examiner* — Garcia Ade

(74) *Attorney, Agent, or Firm* — Alliance IP, LLC

(57) ABSTRACT

A system and method for managing mainframe computer system billable usage includes determining gross mainframe computer system capacity usage for billable mainframe computer system workload, and identifying what of that workload is discount-qualifying mainframe computer system workload. Capacity usage specific to the discount-qualifying mainframe computer system workload is determined in order to determine a billable capacity usage specific to that workload, the determination being based on one or more applicable discount rates applicable thereto. A billable total mainframe computer system capacity usage for the billable mainframe computer system workload is then determined based on the billable capacity usage specific to the discount-qualifying mainframe computer system workload.

9 Claims, 4 Drawing Sheets

SYSTEM AND METHOD FOR MANAGING MAINFRAME COMPUTER SYSTEM BILLABLE USAGE

CROSS-REFERENCE TO RELATED APPLICATION

This application claims the benefit of U.S. Provisional Application Ser. No. 62/024,008, filed on Jul. 14, 2014, the contents of which are herein incorporated by reference in their entirety.

FIELD OF THE INVENTION

The present invention relates to determining and managing mainframe computer system billable usage, and more particularly, to determining billable usage where different rates are applied to different system workload.

BACKGROUND OF THE INVENTION

In the early days of modern computing, the large size and cost of computers tended to result in a concentration of computer equipment in large data centers. Most commercial users of computers would have paid one or more data center operators to perform their computing tasks. Over the past decades, miniaturization and cost decreases have driven a trend toward more commercial computer users owning and operating their own computer systems. This trend is not universal, however.

One exception includes those computer users whose computing needs are particularly massive and/or require exceptional reliability, redundancy or security. Examples of such users include very large corporations, and especially financial sector corporations such as banks, exchanges, brokerages and the like. These types of corporations will often contract with third-party providers to supply their computing needs.

The preeminent example of a third party provider of computing services is the International Business Machines (IBM) Corporation. IBM has several thousand users who pay for the capability and reliability of its System z ("z" standing for "zero downtime") computing platform. The way users rely on the performance of the workload on the System z platform is illustrative background for the present invention's system and method for managing computer usage.

Each group of logically-related computing functions being performed for a user is referred to as a logical partition (LPAR). The workload within each LPAR is divided up into logical entities called Regions (Jobsteps or Started Task); for example, running specific reports, running a set of online transactions, running data base back-ups, etc. Each of the Regions is allocated to a Service Class. Within each Service Class the workload is allocated to one of multiple workload importance levels, e.g. the first part of the workload to a high class but the longer the workload takes to execute, the lower the workload importance level gets.

Service Class settings need to be reviewed and adjusted in a permanent process to the ever changing workload requirements. The performance of the workload on the System z platform is determined by several factors, but most significant are the service class and capacity limitations using DC and GCL and/or hardware limitations. The present inventors have developed systems and methods for managing computer system usage based on the time criticality of workload, an example of which is described in U.S. patent application Ser. No. 14/199,364, filed on Mar. 6, 2014 (U.S. Pat. No. 9,038,090), Ser. No. 14/310,062, filed on Dec. 2, 2014 (U.S. Pat. No. 8,904,405), Ser. No. 14/714,990, filed on May 18, 2015, the contents of which applications are herein incorporated by reference in their entirety.

To gather usage and other data used in the execution of such systems and methods, the present inventors have made use of WLM (Workload Manager), which is an integrated part of the System z software. For reporting and accounting purposes, it is also possible to assign Report Classes to a singular item (e.g. a transaction), a group of items, a region or a group of regions, which each may be assigned to different Service Classes. Thus, a report class is an item of work for which z/OS Workload Manager reports usage data. By default, usage data is reported as total for each service class.

It is also important to consider that the cost to use the System z platform is determined by several factors, but a significant recurring cost for almost every user is the monthly license charge (MLC). This charge is applied for usage of proprietary IBM products that are used in connection with System z, such as the operating system (z/OS), information management system (IMS), customer information control system (CICS), relational database (DB2) and the like.

Generally, the MLC varies depending upon the usage of the IBM products during the billing period (i.e., $2^{nd}$ of month at 0:00 until $1^{st}$ of following month at 24:00). More particularly, product usage is measured in millions of service units (MSU), and the MLC is determined based on the highest average MSU usage of any full 4 hour period within the billing period (referred to as Rolling 4 Hr Average Usage or R4HA). Thus, controlling the MLC involves, in large part, controlling peak MSU usage.

Reports of usage are stored in many different types of records. These records are created by the System Measurement Facility (SMF) and are thus called SMF records. Each type of SMF record reporting some different aspect of system usage, such as transaction usage, data base usage, number of I/O, usage of storage, etc.

Complicating matters, the billing methods previously used would charge one rate for all workload within one LPAR, With the introduction of new pricing methods, it is now possible to run workloads with different rates on one LPAR, with some of the workload charged at a base rate and other workload on the same LPAR charged at a completely different rate (e.g., with a high discount). Examples of this in the context of IBM's System z include "Mobile Workload Pricing" (MWP) and "Collocated Application Pricing." it is even possible that within one Region, different workloads are charged at different rates (e.g., with region CICS, some transactions are discount-eligible and others are not). However, all workload usages are still shown in MSUs, with no real-time pricing distinction. The result is that the real time MSU usage that is shown by existing software may not realistically reflect the MSU usage that will be invoiced: the real time Rolling 4 Hour Average MSU usage may not represent the billable MSU usage.

Customers that can prove that discount eligible workload used certain MSU capacity (e.g., via Service Class or Reporting Class usage reporting) will get a discount to their MLC prices, which is calculated at the end of a billing period. For reference purposes herein, "gross usage" is the value of the used capacity without taking any discounts into consideration, "billable usage" is an effective capacity usage taking into account discounts. As noted, in real time throughout a billing period, only gross MSU usage is shown.

However, this figure therefore only represents the maximum billable MSU usage, but not necessarily the real billable MSU usage.

SUMMARY OF THE INVENTION

In view of the foregoing, it is an object of the present invention to provide improved systems and methods for determining and managing mainframe computer system billable system usage. Giving a simplified example for illustrative purposes, if a user were concerned about managing capacity usage to avoid paying more than the undiscounted price for 1000 MSUs (i.e., a billable capacity usage maximum of 1000 MSUs), the user might implement a gross capacity limit (e.g., via a Defined Capacity limit) of 1000 MSUs.

Given a scenario in which a user has a gross capacity usage of 1000 MSUs, but 40% of that usage is eligible for a 50% discount, the billable capacity usage would only be 800 MSUs (600 undiscounted MSUs plus 400 MSUs at a 50% discount). In this scenario, a gross usage limit could be increased while still observing the billable capacity usage maximum. If the capacity limit is left at 1000 MSUs, the user will be getting a sub-optimal amount of capacity.

To take another scenario where a user has the same desired billable capacity maximum, but has increased a gross capacity limit based on assumptions about discounted usage. For instance, the user sets a gross capacity limit of 1400 MSUs, assuming that there will be approximately 600 MSUs of undiscounted capacity usage and 800 MSUs of capacity usage at a 50% discount; however, actual undiscounted usage turns out to be 800 MSUs. While the billable capacity usage is still less than gross (i.e., 1200 MSU billable versus 1600 MSU gross), the billable usage still exceeds the desired 1000 MSU billable capacity maximum. Thus, the gross capacity limit of 1400 is again sub-optimal with respect to the user's objectives.

According to an embodiment of the present invention, a method for managing mainframe computer system billable usage includes determining gross mainframe computer system capacity usage for billable mainframe computer system workload, and identifying what of that workload is discount-qualifying mainframe computer system workload. Capacity usage specific to the discount-qualifying mainframe computer system workload is determined in order to determine a billable capacity usage specific to that workload, the determination being based on one or more applicable discount rates applicable thereto. A billable total mainframe computer system capacity usage for the billable mainframe computer system workload is then determined based on the billable capacity usage specific to the discount-qualifying mainframe computer system workload.

According to an aspect of the invention, the billable total mainframe computer system capacity usage is used to determine an optimal gross capacity limit for the billable mainframe computer system workload. Determining the optimal gross capacity limit for the billable mainframe computer system workload includes comparing the billable total mainframe computer system capacity usage with a predetermined billable capacity maximum for the billable mainframe computer system workload. A gross capacity limit for the billable mainframe computer system workload can be automatically adjusted based on the optimal gross capacity limit, such that the gross mainframe computer system capacity usage for billable mainframe computer system workload is permitted to exceed the predetermined billable capacity maximum only if the billable total mainframe computer system capacity usage does not.

According to another aspect of the present invention, the gross mainframe computer system capacity usage is measured in a first capacity metric and determining capacity usage specific to the discount-qualifying mainframe computer system workload includes converting from a second capacity metric to the first capacity metric. Converting from the second capacity metric to the first capacity metric can include determining a workload type-dependent conversion variable and/or a hardware-dependent conversion variable. The workload type-dependent conversion variable can include, for example, a number of database accesses and a number of internal calculations. The hardware-dependent conversion variable can include, for example, a number of processors and a type of processor.

These and other objects, aspects and advantages of the present invention will be better appreciated in view of the drawings and following detailed description of preferred embodiments.

DETAILED DESCRIPTION OF PREFERRED EMBODIMENTS

As discussed above, the IBM System z platform is the preeminent contemporary example of third party-provided mainframe computer systems and services. Thus, the following description will be couched in terms relevant to this example. However, those skilled in the art will appreciate that the present invention could be applied to determine mainframe computer system billable usage in the case of other computing service providers with analogous billing practices.

Figure 1:
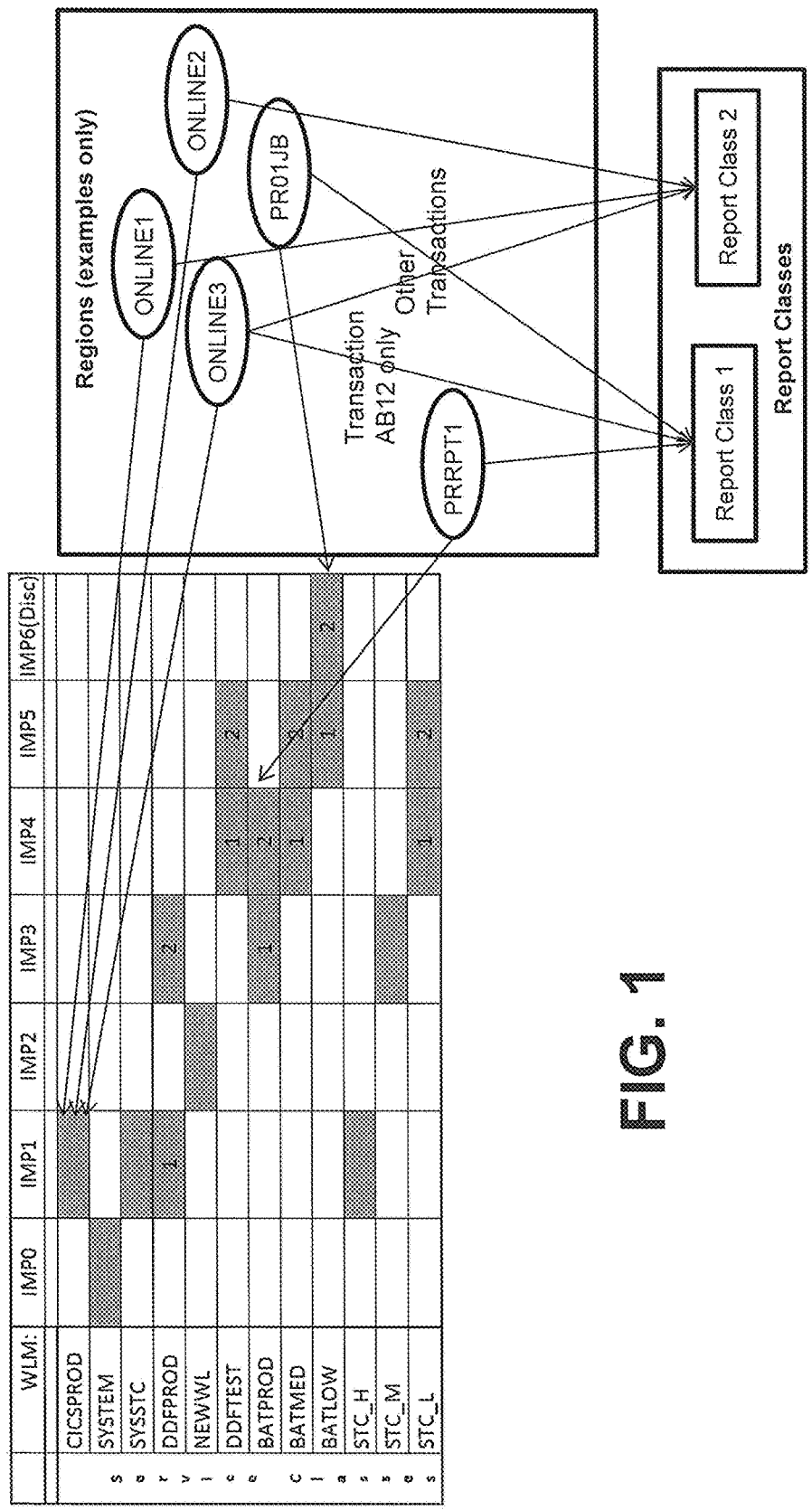
FIG. 1 is a schematic overview of the interplay between WLM important levels, Service Classes, Regions and Report Classes.

Referring to FIG. 1, in an exemplary implementation of mainframe computer system usage, workload within a plurality of Service Classes is assigned to a plurality of WLM importance levels. Examples of Regions constituting the workload in the different Service Classes are called out, with Report Classes defined to report usage relating thereto. More specifically, in the depicted example:

Regions ONLINE1, ONLINE2 and ONLINE3 all run in Service Class CICSPROD.

CICSPROD is assigned to WLM Importance Level 2.

ONLINE1 usage, ONLINE2 usage and usage from all ONLINE3 transactions, with the exception of transaction AB12, are reported in REPORT CLASS 2.

ONLINE3 usage, transaction AB12 only, is reported in Report Class 1.

Service Class NEWWL runs in WLM Importance Level 2 and is the only workload that runs in that WLM importance level.

Region PRRPT1 runs in Service Class BATPROD, the usage is reported in Report Class 1.

Service Class BATPROD is assigned to WLM Importance Level 3 and 4. All Regions in BATPROD start in WLM Importance Level 3 and are degraded to Level 4 after using the capacity that was predefined for Level 3 (e.g. a number of service units).

Region PR01JB runs in Service Class BATLOW, the usage is reported in Report Class 1.

Service Class BATLOW is assigned to WLM Importance Level 5 and 6 (Disc (Discretionary)). All regions in BATLOW start in WLM Importance Level 5 and are degraded to Discretionary after using the capacity that was predefined for Level 5 (e.g. a number of service units).

Figure 2:
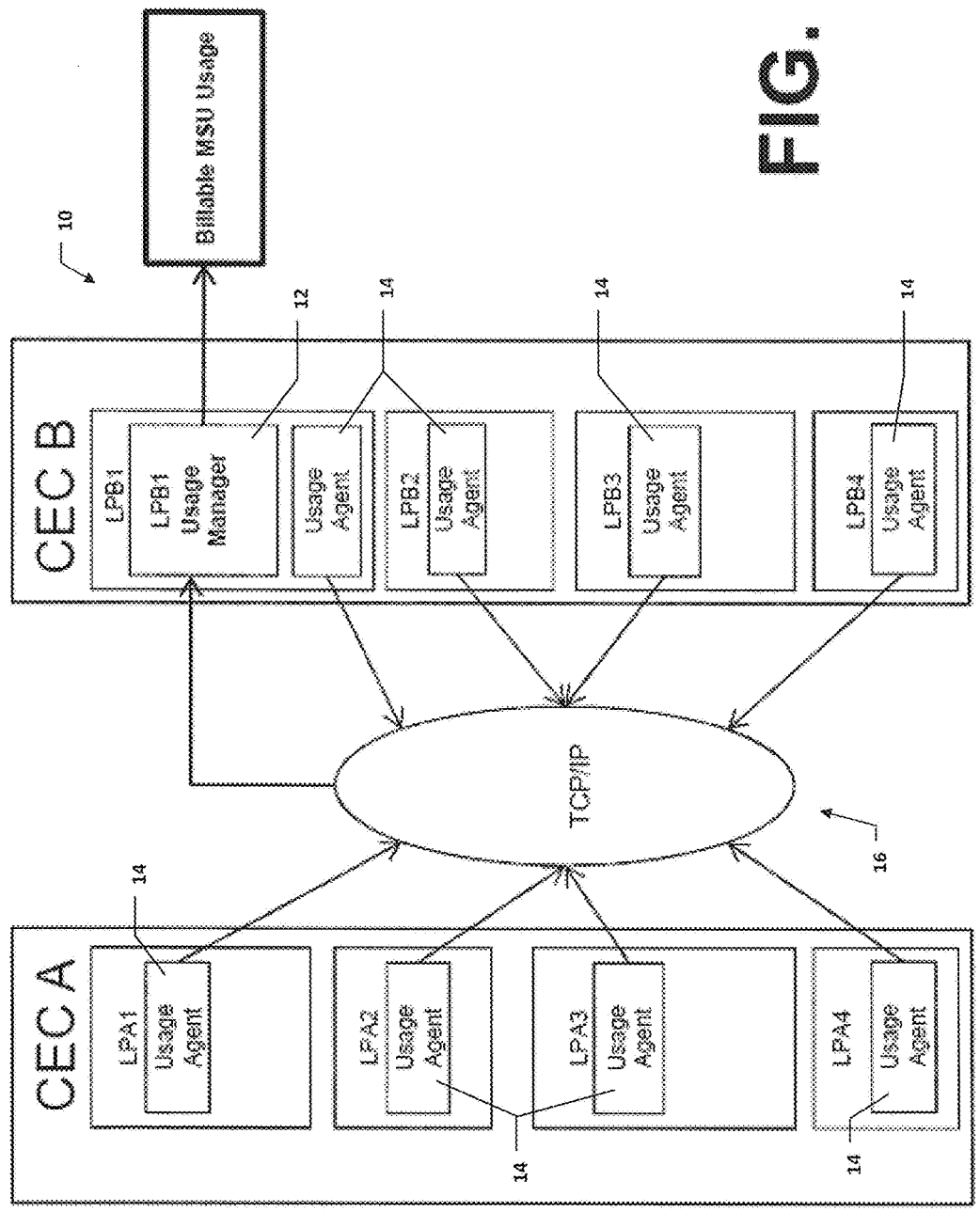
FIG. 2 is a schematic overview of a system for managing mainframe computer system billable usage.

According to an illustrative embodiment of the present invention, with reference to FIG. 2, the above workload is being executed by a user on a mainframe computer system via the executing of a plurality of LPARs (LPA1, LPA2 . . . LPB4) on third party CECs (CEC A, CEC B), such as mainframe computers associated with the IBM System z platform. A system 10 for managing billed computer usage includes a usage manager module 12 installed on at least one of the LPARs (LPB1), and a usage agent 14 installed on each LPAR. The usage manager module 12 allows the user to define the discount eligible workload thru WLM Service Classes and/or Report Classes. Each usage agent 14 collects the current usage data for its respective LPAR and sends it to the manager module 12. Based on the usage information from the agents 14, the manager module 12 determines the billable MSU usage (preferably including both instantaneous MSU usage at the moment and R4HA usage levels).

Data is exchanged between the system agents 14 and the manager 12, over available data/network connections 16 using appropriate communications protocols (e.g., TCP/IP). Prior to initial operation, the user installs the usage manager and agent modules, as in FIG. 2.

With the manager module 12 and usage agents 14 installed, and a discount table established (as will be explained in greater detail below), gross and billable R4HA MSU usage is calculated for every LPAR in real time (e.g., every minute, or preferably at least within every 5 minutes) using the usage data supplied by the usage agents 14. From the foregoing, it will be appreciated that the present invention can automatically provide current and historical information about the gross and billable MSU usage, both instantaneous and R4HA. Due to the complexity of the calculations involved, it should be noted that the billable MSU usage figures determined by the system of the present invention need not match the actual billable usage calculated by the owner of the mainframe computers (e.g., IBM), although they will be a very close estimate. Alone and in connection with the present inventors' other mainframe computer usage management systems, this billable capacity usage data can better help manage and control actual computer usage costs.

Figure 3:
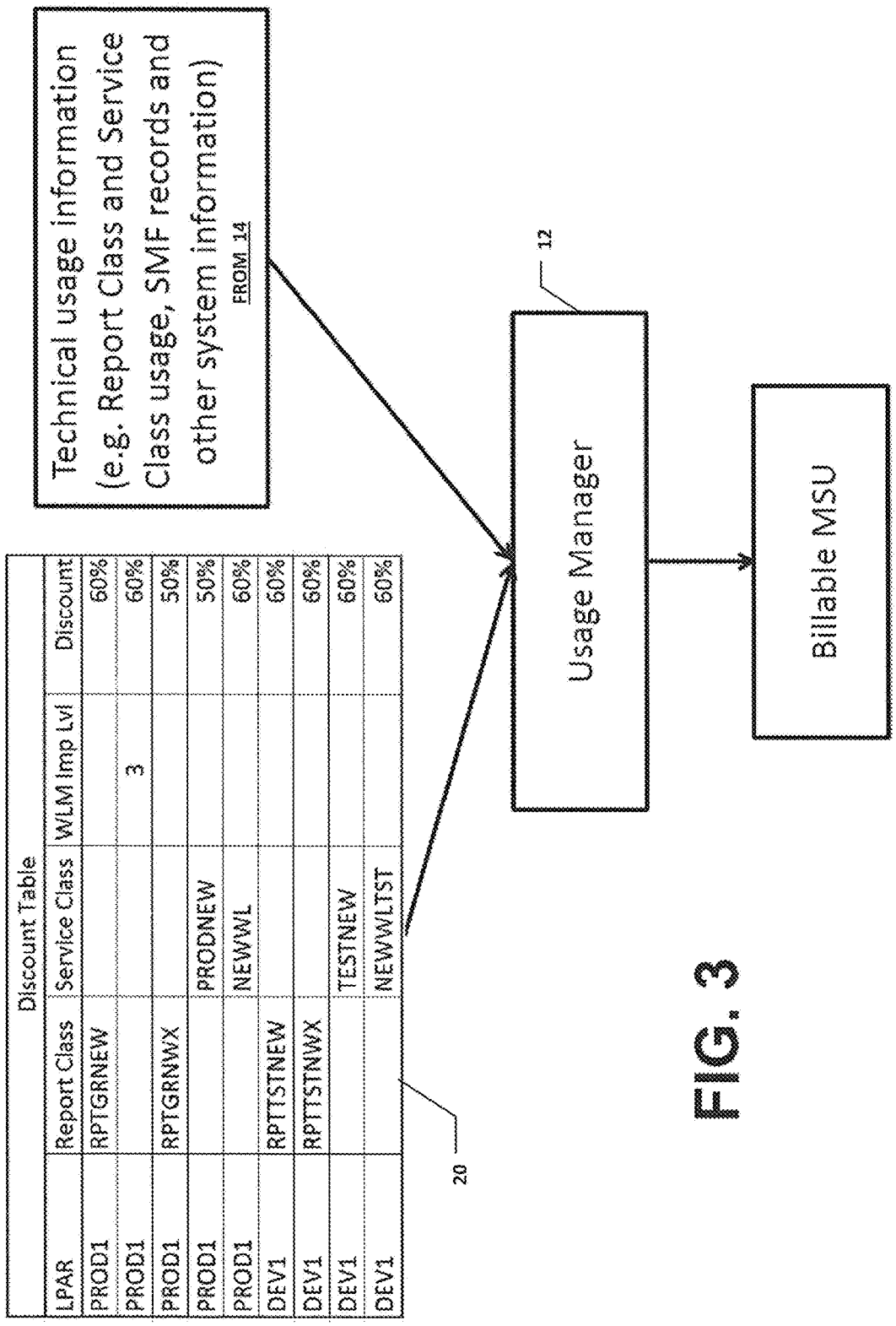
FIG. 3 is a schematic overview detailing inputs and outputs to the system of FIG. 2.

Referring to FIG. 3, the usage manager module 12 receives a discount input, shown in the form a table 20, of workload that is eligible for discounts and respective discount percentages. The agents 14 supply the real time usage information (preferably gross MSU usage, if available for the discounted workload), coming from data sources such as Report Groups, WLM Service Classes, SMF records, etc. The system uses the gross MSU usage and reduces this by the discount on the discount eligible workload for the last interval (default: 5 minutes) and recalculates the R4HA, thereby determining (and displaying to the user, as requested) the billable MSU usage.

Figure 4:
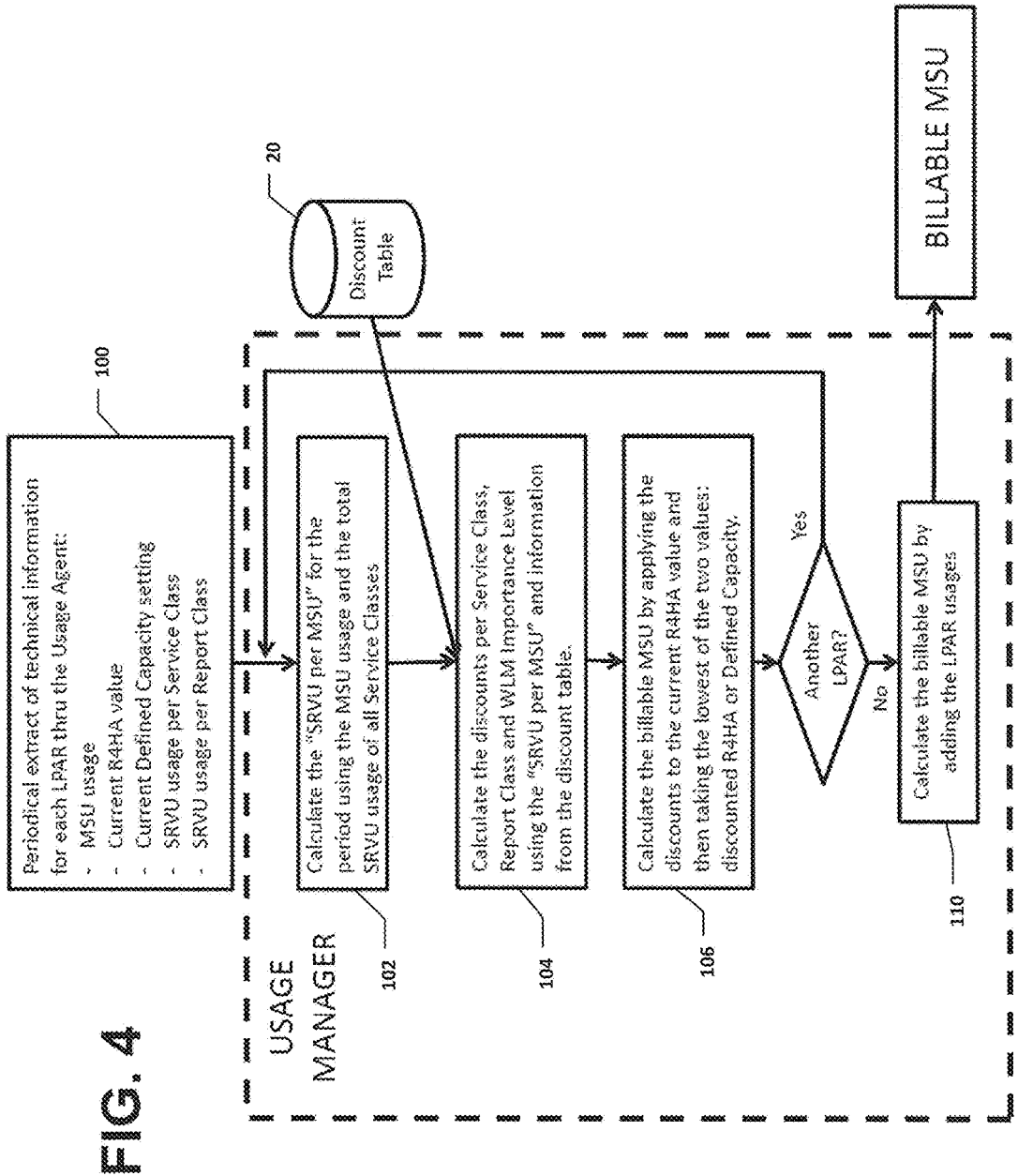
FIG. 4 is a flow diagram of billable usage determinations performed by the system of FIG. 2.

In many cases, the technical input in the form of gross MSU usage will not be directly available for the workload in question from the data sources. Instead the data sources will report other usage figures (such as CPU Time (central processor unit time)), from which the system will calculate gross MSU usage. Referring to FIG. 4, an example of this process is illustrated. At each calculation interval, the usage agents 14 report the following information for each LPAR to the manager module 12 (block 100):

The overall total MSU usage: this information is provided by the standard system interfaces.

The current R4HA value.

The current Defined Capacity setting, if any.

The usage per Service Class in "Service Units" (SRVU).

The usage per Report Class in SRVU.

Since the billable capacity use and capacity limits are based off of MSU numbers, it will be necessary to convert non-MSU usage figures (in this case, SRVU) into MSUs. By using the current MSU usage within a time frame and the number of Service Units that were spent using the MSU, a specific periodic "SRVU per MSU" relationship is calculated for conversion purposes (block 102). This relationship is preferably recalculated every time period, as the relationship may vary depending on factors such as workload type (e.g., numbers of data base accesses, numbers of internal calculations) or hardware (e.g. adding or reducing the number or type of processors of processors).

The discount per Report Class and per Service Class is then determined by using the information from the discount table 20 (block 104). The usage per Report Class or Service Class is converted from Service Units into MSUs using the above-determined "SRVU per MSU" relationship. Subsequently, the discount is calculated.

All discounts are added up and result in a total discount for the period. The discount is subtracted from the current R4HA value (block 106). The discounted R4HA value is compared to the Defined Capacity, with the lower of the two values representing the billable MSU for the LPAR for the period. The sum of all billable MSUs for all LPARs will the billable MSU for the entire CEC (block 110).

Using the billable capacity usage determined by the system 10, the manager 12 or other usage management software can then determine, and adjust if applicable, one or more optimal gross capacity limits for the mainframe computer system. More particularly, a gross capacity limit for the billable mainframe computer system can be set such that the gross mainframe computer system capacity usage for billable mainframe computer system workload is permitted to exceed a predetermined billable capacity maximum as long as the billable total mainframe computer system capacity usage does not.

The above embodiments are provided for illustrative and exemplary purposes; the present invention is not necessarily limited thereto. Rather, those skilled in the art will appreciate that these various modifications, as well as adaptations to particular circumstances, will fall within the scope of the invention as herein shown and described and of the claims appended hereto.

What is claimed is:

1. A method for managing mainframe computer system billable usage comprising:
   determining a gross mainframe computer system capacity usage for billable mainframe computer system workload;
   identifying what of the billable mainframe computer system workload is discount-qualifying mainframe computer system workload;

determining a capacity usage specific to the discount-qualifying mainframe computer system workload;

determining a billable capacity usage specific to the discount-qualifying mainframe computer system workload based on at least one discount rate applicable thereto;

determining a billable total mainframe computer system capacity usage for the billable mainframe computer system workload based on the billable capacity usage specific to the discount-qualifying mainframe computer system workload; and determining an optimal gross capacity limit for the billable mainframe computer system workload based on the billable total mainframe computer system capacity usage;

wherein determining the optimal gross capacity limit for the billable mainframe computer system workload includes comparing the billable total mainframe computer system capacity usage with a predetermined billable capacity maximum for the billable mainframe computer system workload, the method further comprising automatically adjusting a gross capacity limit for the billable mainframe computer system workload based on the optimal gross capacity limit, such that the gross mainframe computer system capacity usage for billable mainframe computer system workload is permitted to exceed the predetermined billable capacity maximum only if the billable total mainframe computer system capacity usage does not.

2. The method of claim 1, wherein identifying the discount-qualifying mainframe computer system workload includes obtaining discount information from a stored discount table.

3. The method of claim 2, wherein the discount-qualifying mainframe computer system workload includes workload originating from mobile devices.

4. The method of claim 1, wherein the gross mainframe computer system capacity usage and the optimal gross capacity limit are measured in a first capacity metric and determining capacity usage specific to the discount-qualifying mainframe computer system workload includes converting from a second capacity metric to the first capacity metric.

5. The method of claim 4, wherein converting from the second capacity metric to the first capacity metric includes determining at least one of: a workload type-dependent conversion variable and a hardware-dependent conversion variable.

6. The method of claim 5, wherein converting from the second capacity metric to the first capacity metric includes determining the workload type-dependent conversion variable, the workload type-dependent conversion variable including at least one of: a number of database accesses and a number of internal calculations.

7. The method of claim 5, wherein converting from the second capacity metric to the first capacity metric includes determining the hardware-dependent conversion variable, the hardware-dependent conversion variable including at least one of: a number of processors and a type of processor.

8. The method of claim 1, wherein determining the total mainframe computer system capacity usage and the effective total mainframe computer system capacity usage both include determining instantaneous and periodic rolling average capacity usages.

9. A non-transitory data storage medium encoded with program instructions to perform the method of claim 1 when executed by a computer system.

* * * * *